United States Patent
Hamel et al.

(10) Patent No.: US 7,848,336 B2
(45) Date of Patent: Dec. 7, 2010

(54) DYNAMICALLY ANCHORING A COMMUNICATION SESSION IN AN IP NETWORK

(75) Inventors: Eric Hamel, Paris (FR); Mark Grayson, Maidenhead (GB); Stephen Ramsay, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 549 days.

(21) Appl. No.: 11/421,645

(22) Filed: Jun. 1, 2006

(65) Prior Publication Data

US 2007/0280202 A1    Dec. 6, 2007

(51) Int. Cl.
 *H04L 12/56* (2006.01)
(52) U.S. Cl. ....................................... 370/401
(58) Field of Classification Search .................. 370/353, 370/401, 467, 496, 524
See application file for complete search history.

(56) References Cited

U.S. PATENT DOCUMENTS

2006/0291419 A1 * 12/2006 McConnell et al. ......... 370/331

OTHER PUBLICATIONS

3GPP Technical Specification 23.806 v7.0.0 (Dec. 2005).*
3rd Generation Partnership Project; Technical Specification Group Services and System Aspects; Voice Call Continuity between CS and IMS Study (Release 7); 3GPP TR 23.806 V1.6.0 Technical Report; Global System for Mobile Communications, 47 pages, Oct. 2005.

* cited by examiner

*Primary Examiner*—Chirag G Shah
*Assistant Examiner*—Yong Zhou
(74) *Attorney, Agent, or Firm*—Baker Botts L.L.P.

(57) ABSTRACT

Anchoring a communication session for a mobile node involves a signaling node that intercepts a routing information request sent by a switching center of a circuit-switched network. The routing information request requests routing information for the communication session. Subscription information associated with the mobile node is retrieved. Whether the mobile node is eligible to be anchored in a packet-switched network is established. Anchoring of the communication session in the packet-switched network is initiated if the mobile node is eligible to be anchored in the packet-switched network.

18 Claims, 2 Drawing Sheets

DYNAMICALLY ANCHORING A COMMUNICATION SESSION IN AN IP NETWORK

TECHNICAL FIELD

This invention relates generally to the field of telecommunications and more specifically to dynamically anchoring a communication session in an IP network.

BACKGROUND

A communication session for a mobile node is typically anchored at an anchor node of a communication network. The anchor node processes the communication session while the mobile node is involved in a handover process. In certain cases, the mobile node may be operable to communicate with different types of networks. For example, a multiple mode mobile node may communicate with an access point of a Wireless Fidelity (WiFi) Voice over Internet Protocol (VoIP) network and with a cell site of a cellular network.

Certain known techniques for anchoring a communication session for a multiple mode mobile node, such as the techniques proposed by the Third Generation Partnership Project (3GPP) technical report 23.806, involve using Intelligent Networking (IN) technologies. These techniques, however, assume that the mobile switching center (MSC) and the IN infrastructure support certain features. Moreover, these techniques may place a heavy burden on the network of the mobile service provider as well as on the mobile switching centers of the roaming network. Accordingly, these techniques are not efficient in certain situations. It is generally desirable to efficiently anchor a communication session.

SUMMARY OF THE DISCLOSURE

In accordance with the present invention, disadvantages and problems associated with previous techniques for anchoring communication sessions may be reduced or eliminated.

According to one embodiment of the present invention, anchoring a communication session for a mobile node involves a signaling node that intercepts a routing information request sent by a switching center of a circuit-switched network. The routing information request requests routing information for the communication session. Subscription information associated with the mobile node is retrieved. Whether the mobile node is eligible to be anchored in a packet-switched network is established. Anchoring of the communication session in the packet-switched network is initiated if the mobile node is eligible to be anchored in the packet-switched network.

Certain embodiments of the invention may provide one or more technical advantages. A technical advantage of one embodiment may be that a signaling node, such as a signal transfer point (STP), may be used to establish whether a communication session for a mobile node anchored in a circuit-switched network should be anchored in a packet-switched network. The signaling node may provide for more efficient anchoring than a mobile switching center.

Another technical advantage of one embodiment may be that the signaling node may decide whether to anchor the communication session in the packet-switched network in accordance with whether the mobile node is eligible to be serviced by the network. For example, the signaling node may establish whether the mobile node is within the coverage of the packet-switched network and has authorization for service in the network. Deciding whether to anchor the communication session in this manner may reduce inefficient anchoring.

Another technical advantage of one embodiment may be that the signaling node may provide routing information that includes a forwarded-to-number. The forwarded-to-number may be used to route the communication session to an anchor node of the packet-switched network.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
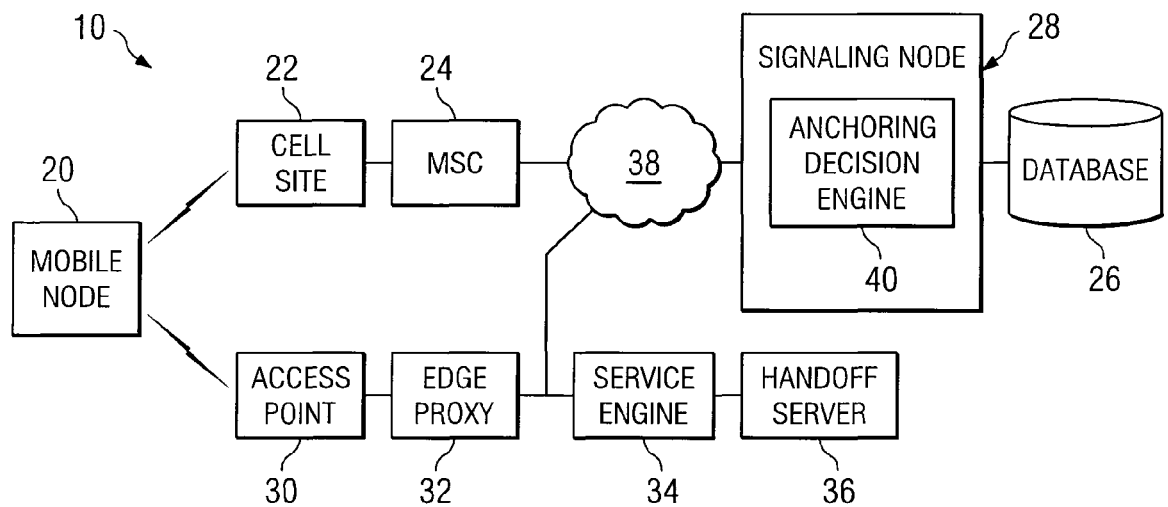
FIG. 1 is a block diagram illustrating one embodiment of a system for which an anchoring decision may be made.
Figure 2:
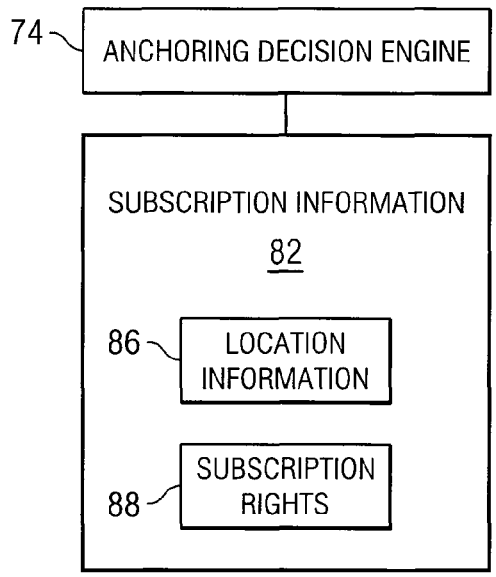
FIG. 2 is a block diagram illustrating one embodiment of signaling node that may be used with the system of FIG. 1.
Figure 3:
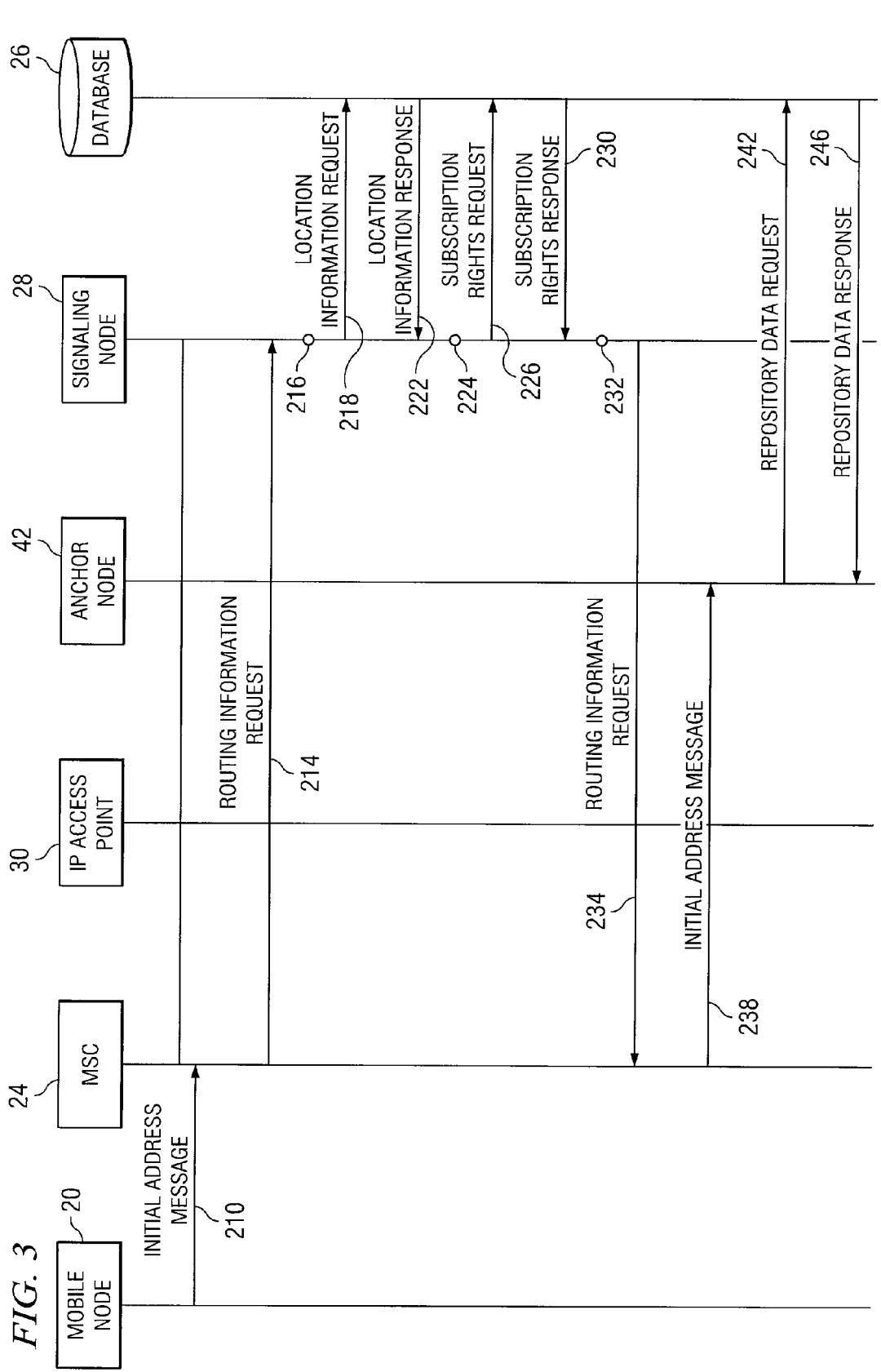
FIG. 3 is a flowchart illustrating one embodiment of method for making an anchoring decision that may be used by the anchoring decision engine of FIG. 2.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system 10 for which an anchoring decision may be made. According to the embodiment, a signaling node 28, such as a signal transfer point (STP), may be used to establish whether a communication session for a mobile node 20 that is anchored in a circuit-switched network should be anchored in a packet-switched network.

Signaling node 28 may decide whether to anchor the communication session in the packet-switched network in accordance with whether the mobile node is eligible to be serviced by the network. For example, signaling node 28 may establish whether mobile node 20 is within the coverage of the packet-switched network and has authorization for service in the network. If signaling node 28 decides to anchor the communication session in the packet-switched network, signaling node 28 may provide routing information that includes a forwarded-to-number. The forwarded-to-number may be used to route the communication session to an anchor node of the packet-switched network.

According to the illustrated embodiment, system 10 operates to provide services such as communication sessions to endpoints such as mobile node 20. A communication session, or call, may refer to an active communication between endpoints, measured from endpoint to endpoint.

Information is communicated during a communication session. Information may refer to voice, data, text, audio, video, multimedia, control, signaling, other information, or any combination of the preceding. Information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 10 includes communication networks. A communication network allows devices such as mobile node 20 to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

A network may utilize communication protocols and technologies to provide communication sessions. Example communication protocols and technologies include those set by the Institute of Electrical and Electronics Engineers, Inc. (IEEE) 802.xx standards such as 802.11 and 802.16 standards, the International Telecommunications Union (ITU-T) standards, the European Telecommunications Standards Institute (ETSI) standards, the Internet Engineering Task Force (IETF) standards, or other standards.

According to one embodiment, system 10 may include networks of different network types. A network type of a network may be designated in accordance with the communication protocols and technologies used for the network. Examples of networks of different network types include circuit-switched and packet-switched networks. Examples of circuit-switched networks include cellular networks. A cellular network may be based on any suitable cellular protocol, for example, protocols set forth by the Global System for Mobile Communications (GSM) standards or the American National Standards Institute (ANSI) 41 standards.

Examples of different packet-switched network types include IP networks, such as wireless IP networks (for example, WiFi IP networks and wireless LANS) and voice over IP (VoIP) networks. An IP network may be based on any suitable packet protocol, for example, the Session Initiation Protocol (SIP) set forth by the IETF.

System 10 includes components such as devices. In general, a device may include any suitable arrangement of components operable to perform the operations of the device, and may comprise logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes a mobile node 20, a cell site 22, a mobile switching center (MSC) 24, a signaling node 28, a database 26, an access point 30, an edge proxy 32, a service engine 34, a handoff server 36, and a network 38 coupled as shown.

Mobile node 20 represents any suitable device operable to communicate with a communication network via a wireless link. Mobile node 20 may comprise, for example, a personal digital assistant, a computer such as a laptop, a cellular telephone, a mobile handset, or any other device operable to communicate with system 10. According to one embodiment, mobile node 20 may be operable to communicate with different types of networks. As an example, mobile node 20 may be operable to communicate with a cellular network and a wireless IP network.

Mobile node 20 may access a network through an access node. An access node may refer to a network node that couples a wireless network, such as a radio frequency (RF) network, to a wired network, such as a wired area network. An access node typically has an access node identifier that uniquely identifies the access node.

An access node is associated with coverage within which the access node can communicate with mobile node 20 via signals over a wireless link. An access node may provide access to mobile node 20 within the coverage of the access node. A coverage zone may refer to a region in which an access node can provide or may potentially provide access. As an example, a coverage zone may include the coverage and additional area proximate to the coverage in which the mobile node 20 may potentially enter the coverage.

As another example, a coverage zone may include the union of coverage areas of associated access nodes. Access nodes may be associated if there is sufficient probability, for example, greater than 90%, that an access node may provide access to mobile node 20 currently served by another access node. For instance, associated access nodes may include nodes that mobile node 20 may use while traveling from one point to another point.

Cell site 22 operates as an access node for a circuit-switched network. According to one embodiment, cell site 22 may represent a cellular network cell site operable to provide cellular wireless services to mobile nodes 20 present in the coverage of cell site 22. Cell site 22 may include a base transceiver station and a base station controller.

Mobile switching center 24 bridges a mobile network with another network. According to one embodiment, mobile switching center represents a telephone switch. Mobile switching center 24 may provide services and coordinate between mobile node 20 and other networks. Mobile switching center 24 may comprise, for example, a Global System for Mobile communication (GSM) mobile switching center.

Access point 30 operates as an access node for a packet-switched network such as an IP network. According to one embodiment, access point 30 represents a WiFi access point. A WiFi access point may provide WiFi wireless services to mobile node 20 present in the coverage of the access point.

Edge proxy 32 ensures that a mobile node 20 that sends messages to edge proxy 32 can receive messages. As an example, edge proxy 32 ensures that a registered mobile node 20 can receive requests. Service engine 34 operates as a signaling hub for access point 30 to establish access to the IP network. As an example, service engine 34 may provide SIP signaling to establish communication sessions for PSTN and IP networks.

Handoff server 36 performs a handover procedure for a communication session for mobile node 20. A handover procedure may refer to the process by which a communication session for mobile node 20 is passed from a previous access node to a current access node as mobile node 20 moves from the coverage of the previous access node to the coverage of the current access node. Network 38 represents a communication network that allows devices to communicate with other devices.

Signaling node 28 comprises any suitable network device operable to store information and perform the operations of anchoring decision engine 40. For example, signaling node 28 may comprise a Signaling System 7 (SS7) signal transfer point (STP) embodied as a service control function (SCF). A signal transfer point may refer to a packet switch of an SS7 network.

Signaling node 28 may have any suitable capabilities to perform the operations of anchoring decision engine 40. For example, signaling node 28 may intercept or send routing information messages. As another example, signaling node 28 may perform voice call continuity (VCC) operations.

Anchoring decision engine 40 makes decisions regarding anchoring a communication session at an anchor node of a network. Anchoring a communication session at an anchor node may refer to having the anchor node process signaling of the communication session. A communication session is typically anchored before call setup and during a handover procedure.

Anchoring a communication session in a network may reduce efficiency in cases where a handoff to the network cannot occur. For example, mobile node 20 may have a home IP network in the United States. If the mobile node 20 travels to Singapore, and if the communication session is anchored in the United States, the communication session would require two international call legs. Accordingly, if handoff to the home IP network cannot occur, then anchoring the communication session in the home IP network reduces efficiency.

According to one embodiment, if a communication session of mobile node 20 is anchored in a first network, anchoring decision engine 40 may decide to anchor the communication session in a second network only if mobile node 20 is eligible for service in the second network. Mobile node 20 may be designated as eligible for service in a network in any suitable manner. According to one embodiment, mobile node 20 may be designated as eligible for service if it satisfies one or more conditions. As a first example condition, mobile node 20 may be required to be within a coverage zone of an access node of the network. As a second example condition, mobile node 20 may be required to have authorization to use a service provided by the network.

If anchoring decision engine 40 decides to anchor mobile node 20 in the IP network, signaling node 28 sends routing information to mobile switching center 24. The routing information may include a forwarded-to identifier for access point 30 that allows mobile switching center 24 to anchor the communication session to access point 30. The forwarded-to identifier may comprise an IP address for access point 30. An example anchoring decision engine 40 is described with reference to FIG. 2.

Database 26 may comprise a memory device operable to store information. According to one embodiment, database 26 may store subscription information that includes location information and subscription rights for mobile node 20. Location information for mobile node 20 may be used to establish if mobile node 20 is within a coverage zone of an access node of a network. Subscription rights for mobile node 20 may be used to establish if mobile node 20 has authorization to use a service provided by the network.

According to one embodiment, database 26 may comprise a home location register (HLR), a home subscriber service (HSS), or any combination of the preceding, and may be located in the home network of mobile node 20. According to one embodiment, mobile switching center 24 may query database 26 over an SS7 link to obtain subscription information. Database 26 may then transfer the subscription data via SS7 to the foreign network, where it may be used during the roaming period within the coverage area of access point 30.

System 10 may include other suitable devices, such as a gateway, a home agent, a foreign agent, an authorization server, other device, or any combination of the preceding. A gateway represents any suitable device operable to interconnect with a network, and may convert communications between different communication protocols. A home agent of a mobile node may refer to an agent that maintains the address of the mobile node and forwards data to the mobile node. A foreign agent of a mobile node may refer to an agent that provides the home agent of the mobile node with an address to which data for the mobile node may be forwarded. An authorization server may represent any suitable device operable to provide authorization-related services.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

FIG. 2 is a block diagram illustrating one embodiment a system 50 that may be used with the system of FIG. 1. According to the embodiment, system 50 includes an anchoring decision engine 74 and subscription information 82.

Anchoring decision engine 74 determines whether to anchor a communication session in a particular network. Anchoring decision engine 74 may use any suitable method to determine whether to anchor a communication session. According to one embodiment, if a communication session of mobile node 20 is anchored in a first network, anchoring decision engine 40 may decide to anchor the communication session in a second network only if mobile node 20 is eligible for service in the second network. As an example, a communication session of a mobile node anchored in a cellular network is anchored in an IP network only if the mobile node is eligible for service in the IP network.

Mobile node 20 may be designated as eligible for service in a network in any suitable manner. According to one embodiment, mobile node 20 may be designated as eligible for service if it satisfies one or more conditions. As a first example condition, mobile node 20 may be required to be within a coverage zone of an access node of the network. As a second example condition, mobile node 20 may be required to have authorization to use a service provided by the network.

Subscription information 82 may comprise information that may be used to identify, verify, or both identify and verify a mobile node 20. According to the illustrated embodiment, subscription information 82 includes location information 86 and subscription rights 88 for mobile node 20. Location information 86 tracks the location of mobile node 20, and may be given in any suitable format. Location information 86 for mobile node 20 may be used to establish if mobile node 20 is within a coverage zone of an access node of a network.

Subscription rights 88 describe the features and services that mobile node 20 is authorized to access. Mobile node 20 may be authorized to access services of a particular technology, such as wireless IP services, or services from a particular network, such as a particular IP network. Subscription rights 88 for mobile node 20 may be used to establish if mobile node 20 has subscription rights to a service provided by the network.

Anchoring decision engine 74 may use any suitable method to determine if mobile node 20 satisfies conditions to be eligible for service. To determine whether mobile node 20 is within a coverage zone of an access node, anchoring decision engine 74 may retrieve the location of mobile node 20 from location information 86. Anchoring decision engine 74 may then establish the coverage zone of the access node, and then establish whether the location is within the coverage zone. Alternatively, anchoring decision engine 74 may send one or more messages to one or more access nodes inquiring as to whether the nodes can support mobile node 20 at a given location. The access nodes may send responses indicating that mobile node 20 is within their coverage zone.

Modifications, additions, or omissions may be made to system 50 without departing from the scope of the invention. The components of system 50 may be integrated or separated according to particular needs. Moreover, the operations of system 50 may be performed by more, fewer, or other modules. Additionally, operations of system 50 may be performed using any suitable logic.

FIG. 3 is a call flow diagram 200 illustrating one embodiment of a method for dynamically anchoring a communication session that may be used with the anchoring decision engine of FIG. 2. The method may be used for mobile node 20 that is initialized in a circuit-switched network, such as a cellular network. Mobile node 20 may be anchored in a packet-switched network, such as a wireless IP network, if mobile node 20 is eligible for service in the IP network.

The method begins at step 210, where mobile switching center 24 receives an initial address message from mobile node 20. Mobile switching center 24 sends a routing information request message at step 214 to database 26 to request subscription information about mobile node 20.

Signaling node 28 intercepts the routing information request message at step 216. Signaling node 28 may intercept the message in order to decide whether to anchor mobile node 20 in the IP network. Signaling node decide whether to anchor mobile node 20 in the IP network by establishing whether mobile node 20 is eligible for service from the IP network.

Steps 218 through 232 describe a process by which signaling node 28 establishes whether mobile node 20 is eligible for service from the IP network. Signaling node 28 sends a location information request to database 26 at step 218. Database 26 sends a location information response at step 222. The location information response may describe the location of mobile node 20. Signaling node 28 determines from the location of mobile node 20 whether mobile node is within the coverage zone of access point 30 of the IP network at step 224.

Signaling node 28 sends a subscription data request at step 226. Database 26 sends a subscription data response at step 230. The subscription data response may describe the subscription rights of mobile node 20. Signaling node 28 determines from the subscription rights of mobile node 20 at step 232 whether mobile node 20 is authorized for the IP service.

If mobile node 20 is within the coverage of an IP access point and is authorized for IP service, signaling node 28 may decide to anchor mobile node 20 in the IP network. Signaling node 28 sends a routing information response to mobile switching center 24 at step 234. The routing information response may include a forwarding data with a forward-to-number. The forward-to-number may be used to anchor the communication session at IP access point 30.

Mobile switching center 24 initiates anchoring of the communication session in the IP network by sending an initial address message to IP anchor node 42 at step 238. In response, IP anchor node 42 sends a user data request to database 26 at step 242. The user data request may request service indicator repository data such as service indicator IP-visitor location register (VLR) data. Database 26 may send a user data response that includes the requested data to IP anchor node 42 at step 246. The method then terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a signaling node, such as a signal transfer point (STP), may be used to establish whether a communication session for a mobile node anchored in a circuit-switched network should be anchored in a packet-switched network. The signaling node may provide for more efficient anchoring than a mobile switching center.

Another technical advantage of one embodiment may be that the signaling node may decide whether to anchor the communication session in the packet-switched network in accordance with whether the mobile node is eligible to be serviced by the network. For example, the signaling node may establish whether the mobile node is within the coverage of the packet-switched network and has authorization for service in the network. Deciding whether to anchor the communication session in this manner may reduce inefficient anchoring.

Another technical advantage of one embodiment may be that the signaling node may provide routing information that includes a forwarded-to-number. The forwarded-to-number may be used to route the communication session to an anchor node of the packet-switched network.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for anchoring a communication session, comprising:
  intercepting at a signaling node a routing information request prior to setting up a communication session for a mobile node, the routing information request sent by a switching center of a first network subsequent to the switching center receiving an initial address message originating the communication session, the first network comprising a circuit-switched network, the routing information request requesting routing information for the communication session;
  retrieving subscription information associated with the mobile node from a subscriber database in a second network, the second network comprising a packet data network, the subscription information indicating whether the mobile node has access to a service of the packet-switched network;
  establishing whether the mobile node is eligible to be anchored in a packet-switched network in accordance with the subscription information of the mobile node;
  establishing whether the mobile node is within a coverage zone of an access node of the packet-switched network, the mobile node being within the coverage zone if the probability of the access node providing access to the mobile node during the communication session exceeds a percentage; and initiating anchoring of the communication session only in the packet-switched network if the mobile node is eligible to be anchored in the packet-switched network and is within the coverage zone, the anchoring initiated prior to setting up the communication session and independent of a handover procedure, the initiating comprising instructing the switching center to forward the initial address message to the packet-switched network.

2. The method of claim 1, wherein:

retrieving the subscription information associated with the mobile node further comprises:
retrieving location information indicating the location of the mobile node; and establishing whether the mobile node is eligible to be anchored in the packet-switched network further comprises:
establishing whether the mobile node is within the coverage zone of the access node of the packet-switched network in accordance with the location of the mobile node.

3. The method of claim 1, wherein initiating anchoring of the communication session in the packet-switched network further comprises:

sending an information response comprising forwarding data, the forwarding data comprising an identifier of an access node of the packet-switched network.

4. The method of claim 1, wherein:

the signaling node further comprises a signal transfer point.

5. The method of claim 1, wherein:

the circuit-switched network further comprises a cellular network; and
the packet-switched network further comprises an Internet Protocol (IP) network.

6. A node for anchoring a communication session, comprising:

an interface operable to:
intercept a routing information request prior to setting up a communication session for a mobile node, the routing information request sent by a switching center of a first network subsequent to the switching center receiving an initial address message originating the communication session, the first network comprising a circuit-switched network, the routing information request requesting routing information for the communication session; and
retrieve subscription information associated with the mobile node from a subscriber database in a second network, the second network comprising a packet data network, the subscription information indicating whether the mobile node has access to a service of the packet-switched network;
a processor coupled to the interface and operable to:
establish whether the mobile node is eligible to be anchored in a packet-switched network in accordance with the subscription information of the mobile node;
establish whether the mobile node is within a coverage zone of an access node of the packet-switched network, the mobile node being within the coverage zone if the probability of the access node providing access to the mobile node during the communication session exceeds a percentage; and
initiate anchoring of the communication session only in the packet-switched network if the mobile node is eligible to be anchored in the packet-switched network and is within the coverage zone, the anchoring initiated prior to setting up the communication session and independent of a handover procedure, the initiating comprising instructing the switching center to forward the initial address message to the packet-switched network.

7. The node of claim 6, wherein:

the interface is further operable to retrieve the subscription information associated with the mobile node by:
retrieving location information indicating the location of the mobile node; and
the processor is further operable to establish whether the mobile node is eligible to be anchored in the packet-switched network by:
establishing whether the mobile node is within the coverage zone of the access node of the packet-switched network in accordance with the location of the mobile node.

8. The node of claim 6, wherein the processor is further operable to initiate anchoring of the communication session in the packet-switched network by:

sending an information response comprising forwarding data, the forwarding data comprising an identifier of an access node of the packet-switched network.

9. The node of claim 6, wherein:

the node further comprises a signal transfer point.

10. The node of claim 6, wherein:

the circuit-switched network further comprises a cellular network; and
the packet-switched network further comprises an Internet Protocol (IP) network.

11. The node of claim 6, wherein:

the node further comprises a signal transfer point;
the circuit-switched network further comprises a cellular network;
the packet-switched network further comprises an Internet Protocol (IP) network;
the interface is further operable to retrieve the subscription information associated with the mobile node by:
retrieving location information indicating the location of the mobile node; and
retrieving subscription data indicating a subscription right of the mobile phone, the subscription right indicating whether the mobile node has access to a service of the packet-switched network; and
the processor is further operable to:
establish whether the mobile node is eligible to be anchored in the packet-switched network by:
establishing whether the mobile node is within the coverage zone of the access node of the packet-switched network in accordance with the location of the mobile node; and
establishing whether the mobile node is authorized for the service in accordance with the subscription right of the mobile node; and
initiate anchoring of the communication session in the packet-switched network by:
sending an information response comprising forwarding data, the forwarding data comprising an identifier of an access node of the packet-switched network.

12. A system for anchoring a communication session, comprising:

means for intercepting at a signaling node a routing information request prior to setting up a communication session for a mobile node, the routing information request sent by a switching center of a first network subsequent to the switching center receiving an initial address message originating the communication session, the first network comprising a circuit-switched network, the routing information request requesting routing information for the communication session;

means for retrieving subscription information associated with the mobile node from a subscriber database in a second network, the second network comprising a packet data network, the subscription information indicating whether the mobile node has access to a service of the packet-switched network;

means for establishing whether the mobile node is eligible to be anchored in a packet-switched network in accordance with the subscription information of the mobile node;

means for establishing whether the mobile node is within a coverage zone of an access node of the packet-switched network, the mobile node being within the coverage zone if the probability of the access node providing access to the mobile node during the communication session exceeds a percentage; and means for initiating anchoring of the communication session only in the packet-switched network if the mobile node is eligible to be anchored in the packet-switched network and is within the coverage zone, the anchoring initiated prior to setting up the communication session and independent of a handover procedure, the initiating comprising instructing the switching center to forward the initial address message to the packet-switched network.

13. A system for anchoring a communication session, comprising:
a switching center of a first network, the first network comprising a circuit-switched network operable to:
receive an initial address message originating the communication session;
send a routing information request prior to setting up a communication session for a mobile node, the routing information request requesting routing information for the communication session; and
a signaling node in communication with the switching center and operable to:
intercept the routing information request;
retrieve subscription information associated with the mobile node from a subscriber database in a second network, the second network comprising a packet data network, the subscription information indicating whether the mobile node has access to a service of the packet-switched network;
establish whether the mobile node is eligible to be anchored in a packet-switched network in accordance with the subscription information of the mobile node;
establish whether the mobile node is within a coverage zone of an access node of the packet-switched network, the mobile node being within the coverage zone if the probability of the access node providing access to the mobile node during the communication session exceeds a percentage; and
initiate anchoring of the communication session only in the packet-switched network if the mobile node is eligible to be anchored in the packet-switched network and is within the coverage zone, the anchoring initiated prior to setting up the communication session and independent of a handover procedure, the initiating comprising instructing the switching center to forward the initial address message to the packet-switched network.

14. The system of claim 13, wherein the signaling node is further operable to:
retrieve the subscription information associated with the mobile node by:
retrieving location information indicating the location of the mobile node; and
establish whether the mobile node is eligible to be anchored in the packet-switched network by:
establishing whether the mobile node is within the coverage zone of the access node of the packet-switched network in accordance with the location of the mobile node.

15. The system of claim 13, wherein the signaling node is further operable to initiate anchoring of the communication session in the packet-switched network by:
sending an information response comprising forwarding data, the forwarding data comprising an identifier of an access node of the packet-switched network.

16. The system of claim 13, wherein:
the signaling node further comprises a signal transfer point.

17. The system of claim 13, wherein:
the circuit-switched network further comprises a cellular network; and
the packet-switched network further comprises an Internet Protocol (IP) network.

18. The system of claim 13, wherein:
the signaling node further comprises a signal transfer point;
the circuit-switched network further comprises a cellular network;
the packet-switched network further comprises an Internet Protocol (IP) network; and
the signaling node is further operable to:
retrieve the subscription information associated with the mobile node by:
retrieving location information indicating the location of the mobile node; and
retrieving subscription data indicating a subscription right of the mobile phone, the subscription right indicating whether the mobile node has access to a service of the packet-switched network; and
establish whether the mobile node is eligible to be anchored in the packet-switched network by:
establishing whether the mobile node is within the coverage zone of the access node of the packet-switched network in accordance with the location of the mobile node; and
establishing whether the mobile node is authorized for the service in accordance with the subscription right of the mobile node;
initiate anchoring of the communication session in the packet-switched network by:
sending an information response comprising forwarding data, the forwarding data comprising an identifier of an access node of the packet-switched network.

* * * * *